United States Patent
Hwang et al.

(10) Patent No.: US 7,426,696 B1
(45) Date of Patent: Sep. 16, 2008

(54) METHOD AND SYSTEM FOR IMAGE WINDOWING

(75) Inventors: Vu Hwang, San Jose, CA (US); Nam Phu Thanh Do, Pleasanton, CA (US)

(73) Assignee: Minerva Networks, Inc., Alviso, CA (US)

( * ) Notice: Subject to any disclaimer, the term of this patent is extended or adjusted under 35 U.S.C. 154(b) by 360 days.

(21) Appl. No.: 11/183,001

(22) Filed: Jul. 15, 2005

(51) Int. Cl.
*G06F 3/048* (2006.01)

(52) U.S. Cl. .................. 715/784; 715/785; 715/830; 715/829

(58) Field of Classification Search ................. 715/784, 715/785, 830, 829, 203
See application file for complete search history.

(56) References Cited

U.S. PATENT DOCUMENTS 7,242,988 B1 *  7/2007  Hoffberg et al. ............. 700/28

2002/0040475 A1 *  4/2002  Yap et al. ................. 725/39
2002/0188956 A1 * 12/2002  Ficco et al. ............. 725/110

* cited by examiner

*Primary Examiner*—Jinhee J Lee
(74) *Attorney, Agent, or Firm*—Roger H. Chu

(57) ABSTRACT

Improved techniques for managing image data associating with asset records in an electronic media programs catalog list between a media server (e.g., a video-on-demand server) and a terminal device or a client system (e.g., a set-top box) is disclosed. The catalog list is created by a module and displayed on a terminal device. Each of the asset records represents a media program that the user can browse. Each of these media programs may associate with a graphical image data, which is also displayed, when the user browses at that particular record. The image data are stored on the media server with a portion duplicated in an image windowing cache on the terminal device. The image windowing cache is intelligently filled by a predictive pre-fetch operation in the background while the user browses a particular record. The predictive operation ensures additional n images are pre-fetched in user scroll direction.

24 Claims, 9 Drawing Sheets

FIG. 3C

METHOD AND SYSTEM FOR IMAGE WINDOWING

BACKGROUND OF THE INVENTION

1. Field of the Invention

The present invention relates to managing image data (or images) associated with a media program or media asset record in a terminal device (e.g., a set-top box), and more particularly to methods and systems for pre-fetch images from a server (e.g., a video-on-demand server) to enable users to browse an electronic media program catalog list on a terminal device. Each record in the catalog list has an image associated with. Only predicative pre-fetched images are stored in the image windowing cache on the terminal device.

2. Description of the Related Art

The Internet is a rapidly growing communication network of interconnected computers around the world and is penetrating into every household in the United States and many other countries in the world. Together, these millions of connected computers form a vast repository of multimedia information that is readily accessible by users through any of the connected computers from anywhere at anytime. Multimedia information that is commonly available and deliverable via the Internet may include text information, images and graphics, video and audio, and alike.

Continuous media information such as video and audio contents has become one of the most demanded resources over the Internet. Delivery of such information over the Internet provides many advantages and benefits that cannot be matched by current terrestrial (over-the-air), cable or satellite television systems. Given the vast accessibility of the Internet to the general population, many Internet service providers or Internet content providers are starting to broadcast continuous media programs over the Internet. In addition to the scheduled broadcast programs, some of the premium media programs (e.g., movies, videos, premium sports events, etc.) are delivered to a subscriber or user on demand. The subscriber or user usually orders these on-demand media programs via an electronic catalog list that can be displayed (e.g., showing a menu list on a television connecting to a set-top box or computer monitor) and interacted (e.g., browsing with a remote control, a mouse, or a touch screen interface).

The set-top box is generally a terminal device or a computer. When the application generates an electronic media programs catalog list on the set-top box, a number of computing resources (e.g., storage space such as memory and disk) are required. A media program may be a video, a movie, a game and alike. A database contains all information related to the available media programs must be stored. The information for each media program includes a text based record and a graphical image in general. The text data contains a title and a brief description. The image data graphically depicts the media program. One method is to store all of the information on the terminal device, so the application can access these data locally. Due to the cost consideration, many of the set-top boxes carry very small amount of the storage. Some do not have any hard disk space. Hence, this method is not practice when the set-top box has very little storage space.

Another method is to store all data on the server. The problem with this method is that the application needs to access the data remotely via a data network all the time. As a result, the performance of the application will suffer in general, and the user always needs to wait for the data transmission each time.

Therefore, there is a need for improved techniques for managing image data on a terminal device (e.g., a set-top box) in order to display the image associated with each of the media programs without increasing cost and operation burdens on a subscriber/user and still providing satisfying experience.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

Broadly speaking, the invention relates to improved techniques for managing image data associating with a plurality of asset records in an electronic media programs catalog list between a media server (e.g., a video-on-demand server) and a terminal device or a client system (e.g., a set-top box).

According to one aspect of the invention, the catalog list is created by a software module and displayed on a terminal device. Each of the asset records represents a media program that the user/subscriber can browse. A typical asset record contains the text data of the title of the media program and associated metadata (e.g., the description, the rental price if applicable, length of the media program, etc.). Each of these media program may associate with a graphical image data, which may be displayed along with the text data, when the user browses that particular record. All of the text and image data are in general available on a database, which is remotely located and accessed from the media server. The relatively large image data are stored on the media server with a portion of image data duplicated in an image windowing cache on the terminal device. The image windowing cache is intelligently filled by a predictive pre-fetch operation in the background while the user browses at a particular record. The predictive operation ensures additional n images are pre-fetched in the user scroll direction. The number n is pre-determined either by the user or automatically calculated by the software module based on the available space in the image windowing cache. The method is also intelligent enough to recognize and ignore the very fast scroll.

The invention can be implemented in numerous ways, including a method, system, device, or a computer readable medium. Several embodiments of the invention are discussed below.

As a method for pre-fetching data for displaying graphical images associated with media asset records, the method comprises: receiving a browsing request at a terminal device, displaying a catalog list for all of the media asset records stored on the terminal device, monitoring a first record position in the catalog list controlled by a first user scroll, when speed of the first user scroll is slower than a predefined time interval, establishing the first record position as a media program of interest, when image associated with the media program is unavailable in a local image windowing cache, displaying text data of the media program along with a loading image message, fetching the image from a server, and inserting the image into the image windowing cache; otherwise, displaying text data of the media program along with the image associated with the media program, pre-fetching additional n images from the server, inserting the additional n images into the image windowing cache, and continue monitoring a second record position in the catalog list controlled by a second user scroll.

As a system for pre-fetching data for displaying graphical images associated with media asset records, the system comprises: a data network, a server coupled to the data network, said server configured to store images associating with the media asset records, a terminal device coupled to the data network, said terminal device includes: a communication interface to communicate with the server via the data network, a memory for storing computer readable code for an application module, an I/O interface coupled to a control device for receiving input from a user and coupled to an output device for displaying the application module output, and a processor coupled to the memory, the I/O interface, and the communication interface, the processor executing the computer readable code in the memory to cause the application module to perform operations of: receiving a browsing request from the user, displaying a catalog list for all of the media asset records stored in the memory on the terminal device, monitoring a first record position in the catalog list controlled by a first user scroll and detecting a speed of the first user scroll, when the speed is slower than a predefined time interval, establishing the first record position as a media program of interest; when image associated with the media program is unavailable in a local image windowing cache in the memory, displaying text data of the media program along with a loading image message, fetching the image from one of the images on the server, and inserting the image into the image windowing cache, otherwise, displaying text data of the media program along with the image associated with the media program, pre-fetching additional n images from the server, inserting the additional n images into the image windowing cache, and continue monitoring a second record position in the catalog list controlled by a second user scroll.

The advantages of the invention are numerous. Different embodiments or implementations may yield one or more of the following advantages. One advantage of the invention is that the user can browse an electronic media programs catalog list on a terminal device as if all of the image data were stored locally. Another advantage is that the invention intelligently recognizes and ignores the very fast user scroll.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 1B shows another configuration with a centrally controlled recording device located remotely from the client system, one embodiment of the present invention can be implemented in;

FIGS. 3C and 3D are representative screen shots for image windowing according to one embodiment of the present invention.

DETAILED DESCRIPTION OF THE PREFERRED EMBODIMENTS

Figure 1A:
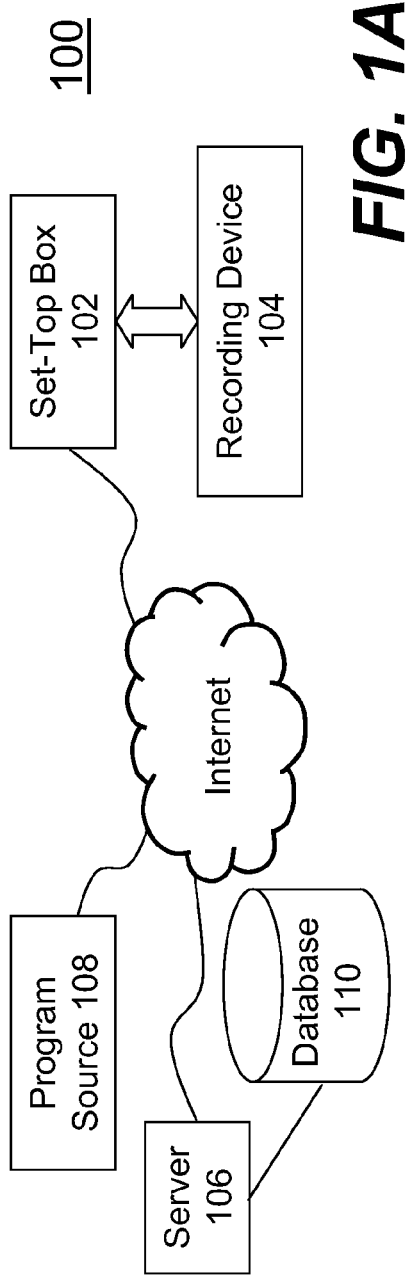
FIG. 1A shows a configuration with a local recording device located locally to a client system (e.g., TiVo), in that an embodiment of the present invention can be implemented.

The invention relates to improved techniques for managing image data associating with a plurality of asset records in an electronic media programs catalog list between a media server (e.g., a video-on-demand server) and a terminal device or a client system (e.g., a set-top box). According to one aspect of the invention, the catalog list is created by a software module and displayed on a terminal device. The user or subscriber browses and controls the software module with an input device, which may include, but not be limited to, a remote control, a keyboard, a mouse, a pointing device, a touch interface, and alike. Each of the asset records represents a media program that the user/subscriber can browse. A typical asset record contains the text data of the title of the media program and associated metadata (e.g., the description, the rental price if applicable, length of the media program, etc.). Each of these media program may associate with a graphical image data, which may be displayed along with the text data, when the user is browsing that particular record. All of the text and image data are in general available on a database, which is remotely located and accessed from the media server. In order to create a catalog list on the terminal device, the relatively small text data are stored in the memory or hard disk of the client system. The relatively large image data are stored on the media server with a portion of image data duplicated in an image windowing cache on the terminal device. The portion of the image data stored in the image windowing cache is fetched in from the server based on the record being browsed by the user. The image windowing cache is intelligently filled by a predictive pre-fetch operation in the background while the user browses at a particular record. The predictive operation ensures additional n images are pre-fetched in the user scroll direction. The number n is pre-determined either by the user or automatically calculated by the software module based on the available space in the image windowing cache. The method is intelligent to recognize and ignore the very fast scroll. For example, when a user scrolls down a number of records to reach the desired record, no pre-fetch operation will perform to avoid thrashing. A very fast scroll may be defined as a scrolling interval is shorter than certain predetermined threshold time (e.g., one second between two key presses). Other aspects and advantages of the invention will become apparent from the following detailed description taken in conjunction with the accompanying drawings which illustrate, by way of example, the principles of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of this aspect of the invention are discussed below with reference to FIGS. 1A-4C. However, those skilled in the art will readily appreciate that the detailed description given herein with respect to these figures is for explanatory purposes as the invention extends beyond these limited embodiments.

Referring now to the drawings, in which like numerals refer to like parts throughout several views. FIG. 1A shows a configuration 100 that one embodiment of the present invention may be implemented in. The configuration 100 is a solution is based on Personal Video Recorder (PVR) that allows for recording of media programs in a local storage device (e.g., hard disk) that connects to a set-top box 102. In the configuration 100, a set-top box 102 coupled to a recording mechanism 104 in the user, client, or subscriber side. The set-top box 102 can be programmed to record media programs delivered from a media server or server 106. The media server 106 is configured to feed one or more media programs from a source 108 to its subscribers or users. Many of the data associated with the media programs can be stored in a database 110, which is configured to be controlled by the server 106. The present invention may be implemented using software and may be implemented in computer systems such as the set-top box 102 of FIG. 1A. In one embodiment, the user orders a media program by browsing an electronic media programs catalog list on a display coupled to a set-top box 102. The present invention allows the user to scroll up and down the catalog list sequentially to browse the media asset records and an associated image representation of each media program in the list. The media asset records in the list may include, but not be limited to, title, brief descriptions, length of the program, actor information, and alike. In addition, there is a graphical image to associate with each of these records. In one embodiment, the relatively small text base asset records are stored in the memory or hard disk of a set-top box 102. The relatively larger graphical images are stored both on the memory of the set-top box 102 and the storage device of the media server 106. The graphical image needs to be fetched from the server to the set-top box, if the image is not stored in the image windowing cache. Additional images are pre-fetched in the background to anticipate the next user scroll. The details are discussed in FIG. 4A and the description thereof.

Figure 1B:
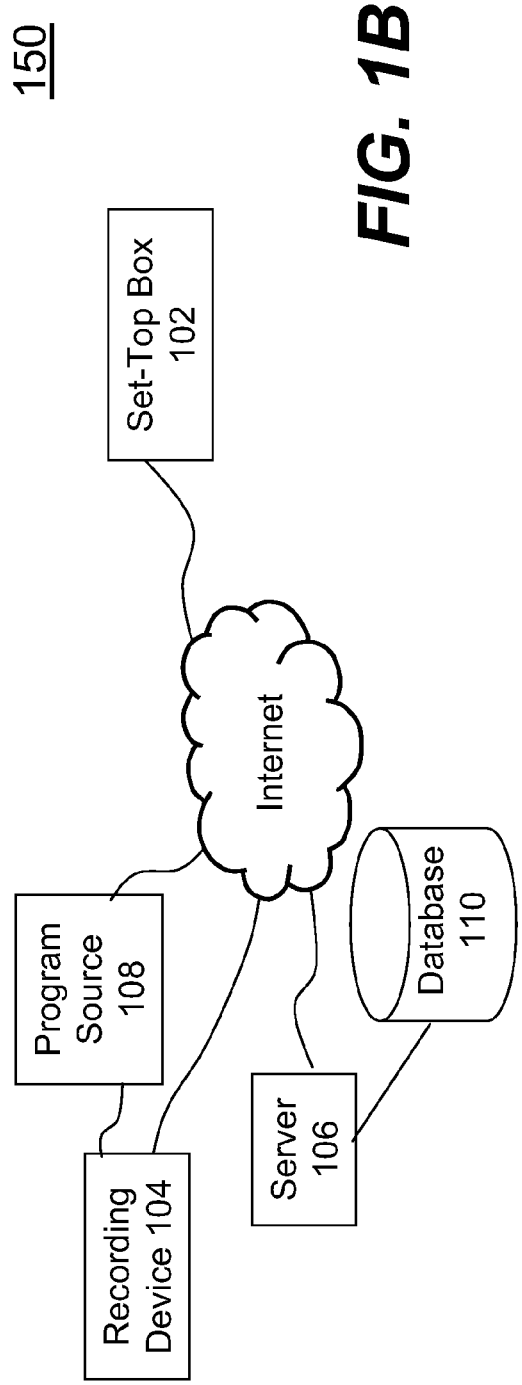

FIG. 1B shows another configuration 150 for which the recording mechanism 104 is located remotely away from the user. As shown in FIG. 1B, the set-top box 102 on the user side is no longer coupled to the recording mechanism 104. Instead, the recording mechanism 104 is now coupled to a media server 106 that diverts media programs for recording to the recording mechanism 104, while the program for viewing is diverted to the set-top box 102. The source 108 of the media programs are coupled to the server 106 via a data network (e.g., Internet). A database 110 containing many of the media program data is coupled to the server 106. In one embodiment, when the present invention is implemented in the set-top box 102 in the configuration 150, the graphical images can only be stored in the memory of the set-top box 102. The set-top box 102 in the configuration 150 does not have any hard disk storage. Pre-fetching images to the image windowing cache in the memory of the set-top box 102 is vital to ensure that the user can browse a media program with associated image at the same time.

Figure 2:
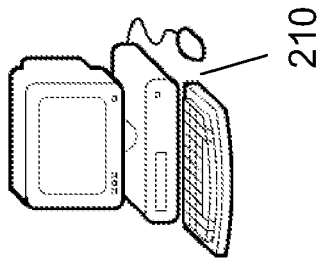
FIG. 2 illustrates a media program delivery system according to one embodiment of the present invention.
Figure 2:
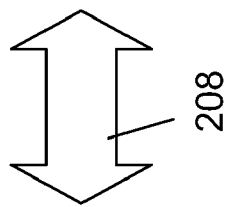
Figure 2:
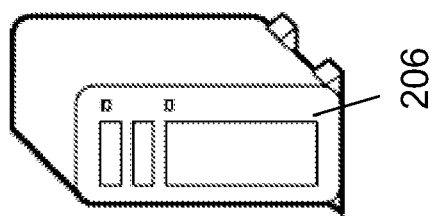
Figure 2:
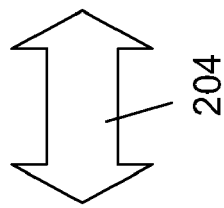
Figure 2:
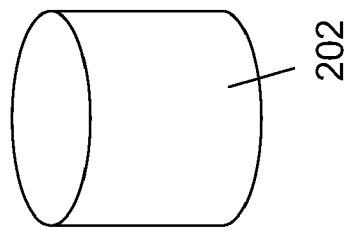

FIG. 2 illustrates a media delivery system 200 according to one embodiment of the invention. The media contents are provided by one or more media sources (i.e., content providers) 202. Examples of media sources may include, but not be limited to, pre-recorded media programs, broadcast television stations, satellite receivers, television relay stations, analog or digital radio station and Internet sites that provide continuous media signals over the Internet. The media contents can take a variety of forms including, but not limited to, movies (videos), audio, news, games, commercial advertisement, events, etc. The media delivery system 200 comprises one or more servers 206, of which only one is shown in FIG. 2. The servers 206 can also be referred to as head-ends. Each of the servers 206 can provide continuous media services, video-on-demand services and audio-on-demand services to its subscribers. Each of the servers 206 can also provide video/audio mail services and commercial information delivery to its subscribers. For example, in video-on-demand services, each of the servers 206 must be able to provide the media programs to the client system 210, in which the users requested or purchased the media programs. To facilitate the user to request, select or purchase a media program, an electronic media programs catalog list is displayed in the display device of the client system 210. The user can browse and then decide to purchase the media program via the list. In general, a graphical image is shown along with the description of each media program, when the user stops at a particular record location of the catalog list.

The server 206 communicates with the media source 202 through a delivery agent 204. Depending on implementation, the delivery agent 204 can, for example, represent a receiver, a data network, a transcoder (encoder and decoder), or a converter. When the media source 202 is a satellite dish, a broadcasting or relay station, then the delivery agent 204 includes a receiver which receives television (TV) signals that are often in a form that may need to be processed by a transcoder (i.e., encoder and decoder). Generally, such TV signals are in an analog format. Hence, the delivery agent 204 can include an encoder that digitizes the TV signals and converts the digitized TV signals to a digital format (e.g., MPEG) so that the signals can be further processed, stored, and redelivered over a network 208.

On the other hand, when the media source 202 is a network video source over a data network (e.g., the Internet), the delivery agent 204 may be simply part of the data network or may include a converter. Typically, a video source provided by a service or content provider is in MPEG format and may/may not required conversion depending on the version of the MPEG format. As described above, the media source 202 may take one of the many available video sources and supply it to the server 206 in an appropriate format via the delivery agent 204. In the following description, unless otherwise specifically required, the server 206 receives one or more appropriate video sources, typically in MPEG format, from the media source 202 via the delivery agent 204.

The network 208 couples the server 206 to a terminal or client device 210. The network 208 can be part of a larger network including the Internet, the public switch telephone network (PSTN), a private network, or a wireless network. Through the network 208, the terminal device 210 can receive video services provided by the server 206. Examples of the terminal device 210 may include a desktop computer, a laptop or notebook computer, a set-top box, and a mobile device. In one embodiment, the terminal device 210 (utilized by one or more users) can be coupled to the network 208 by way of a circuit-switched or packet-switched connection. The network 208 can use one or more different transmission mediums, such as a telephone network, a broadband network (e.g., xDSL, ATM or SONET), etc. It is, however, useful that the transmission mediums have high bandwidths to support delivery of media-rich content and to ensure the quality of service (QoS) thereof.

Figure 3A:
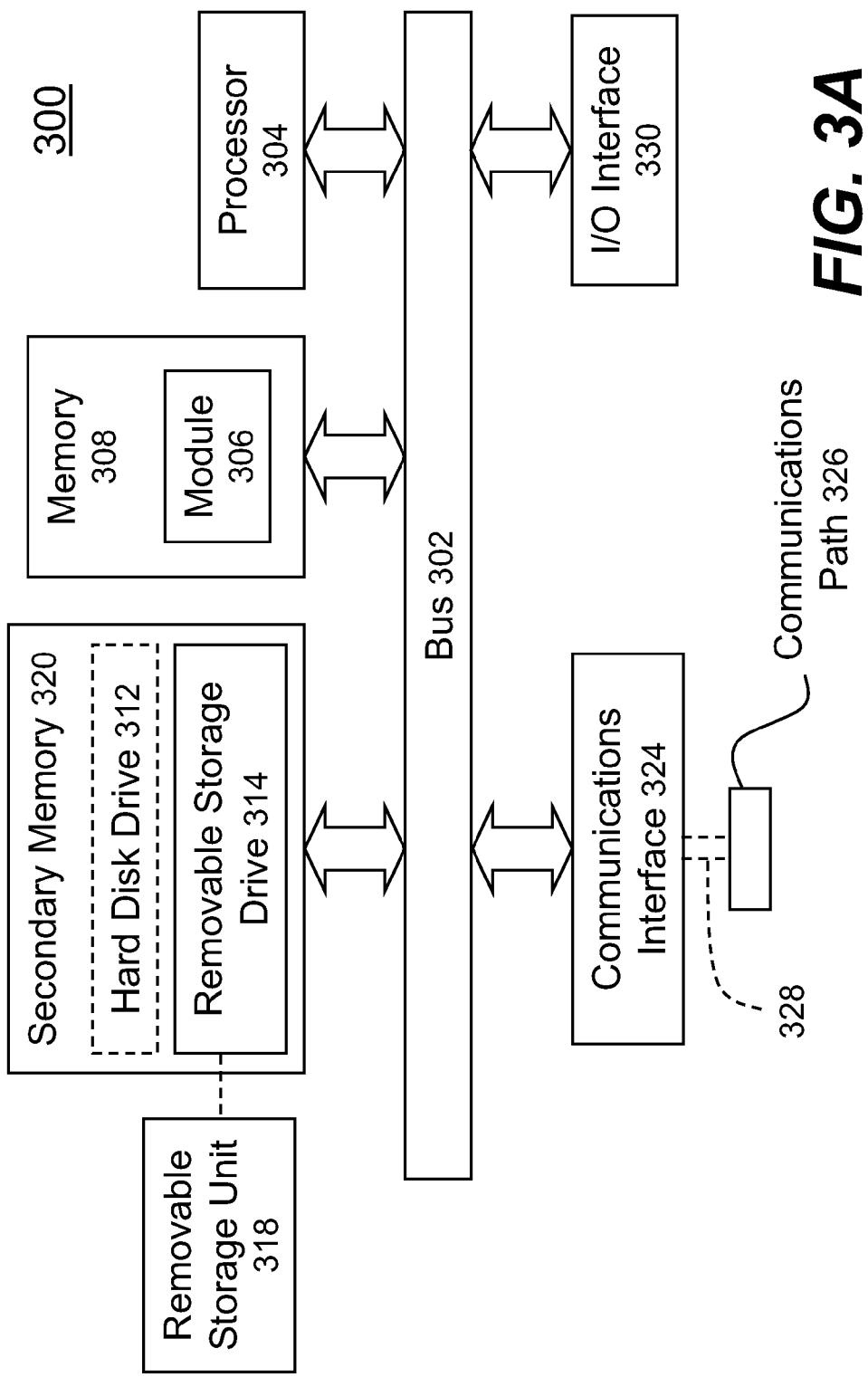
FIG. 3A is a block diagram of a client system (e.g., a set-top box) according to one embodiment of the present invention.

In one embodiment, the present invention may be implemented in an exemplary computer system 300 as shown in FIG. 3A. Various software embodiments are described in terms of this exemplary computer system 300. After reading this description, it will become apparent to a person skilled in the relevant art(s) how to implement the invention using other computer systems and/or computer architectures.

Computer system 300 also includes a bus 302, a processor 304 and a main memory 308, preferably random access memory (RAM), and may also include a secondary memory 320. The optional secondary memory 320 may include, for example, one or more hard disk drives 312 and/or one or more removable storage drives 314, representing a floppy disk drive, a magnetic tape drive, an optical disk drive, etc. The removable storage drive 314 reads from and/or writes to a removable storage unit 318 in a well-known manner. Removable storage unit 318, represents a floppy disk, magnetic tape, optical disk, etc. which is read by and written to by removable storage drive. As will be appreciated, the removable storage unit 318 includes a computer usable storage medium having stored therein computer software and/or data. In one embodiment, the set-top box 102 of FIG. 1B is a computer system 300 without any hard disk drive 312. In another embodiment, the set-top box 102 along with the recording device 104 of FIG. 1A is a computer system 302 including hard disk drive 312.

There may also be a communications interface 324 connecting to the bus 302. Communications interface 324 allows software and data to be transferred between computer system 300 and external devices. Examples of communications interface 324 may include a modem, a network interface (such as an Ethernet card), a communications port, a PCMCIA slot and card, etc. Software and data transferred via communications interface 324 are in the form of signals 328 which may be electronic, electromagnetic, optical, or other signals capable of being received by communications interface 324. These signals 328 are provided to communications interface 324 via a communications path (i.e., channel) 326. This channel 326 carries signals (or data flows) 328 and may be implemented using wire or cable, fiber optics, a phone line, a cellular phone link, an RF link and other communications channels. In one embodiment, the communication path 326 is a data network (e.g., 208 of FIG. 2).

The channel 326 facilitates a data flow 328 between a data network (e.g. 150 in FIG. 1B) and the computer 300 and typically executes a special set of rules (i.e., a protocol) to send data back and forth. One of the common protocols is TCP/IP (Transmission Control Protocol/Internet Protocol) commonly used in the Internet. In general, the communication interface 324 manages the assembling of a data file into smaller packets that are transmitted over the data network or reassembles received packets into the original data file. In addition, the communication interface 324 handles the address part of each packet so that it gets to the right destination or intercepts packets destined for the computer 300.

In this document, the terms "computer program medium" and "computer usable medium" are used to generally refer to media such as removable storage drive 314, a hard disk installed in hard disk drive 312, and signals 328. These computer program products are means for providing software to computer system 300. The invention is directed to such computer program products.

The computer system 300 may also include an I/O interface 330, which provides the computer system 300 to access monitor, keyboard, mouse, printer, scanner, plotter, and a like.

Computer programs (also called computer control logic) are stored as application modules 306 in main memory 308 and/or secondary memory 320. Computer programs may also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312, or communications interface 324. The application module 306, when executed by the processor 304, causes the processor 304 to perform the functions of the invention as described herein.

Figure 3B:
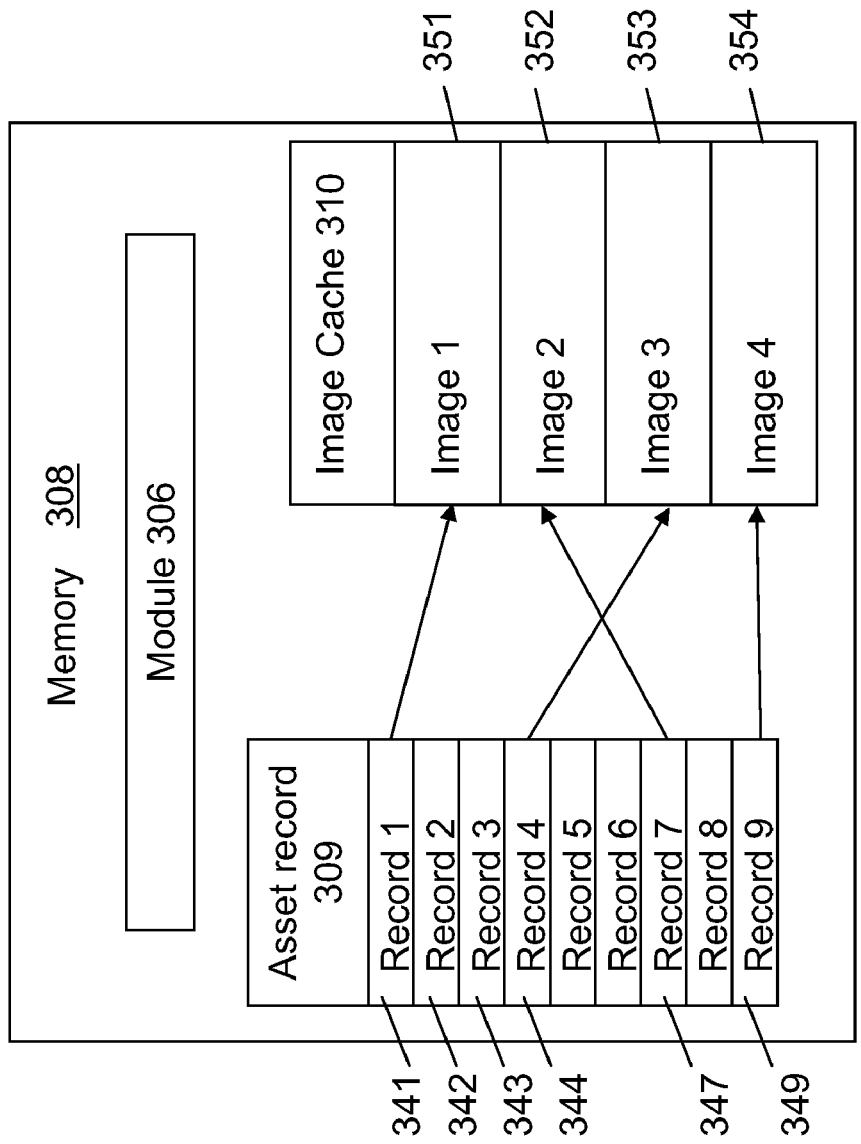
FIG. 3B shows a block diagram of the memory of the client system in accordance with one embodiment of the present invention.
Figure 3C:
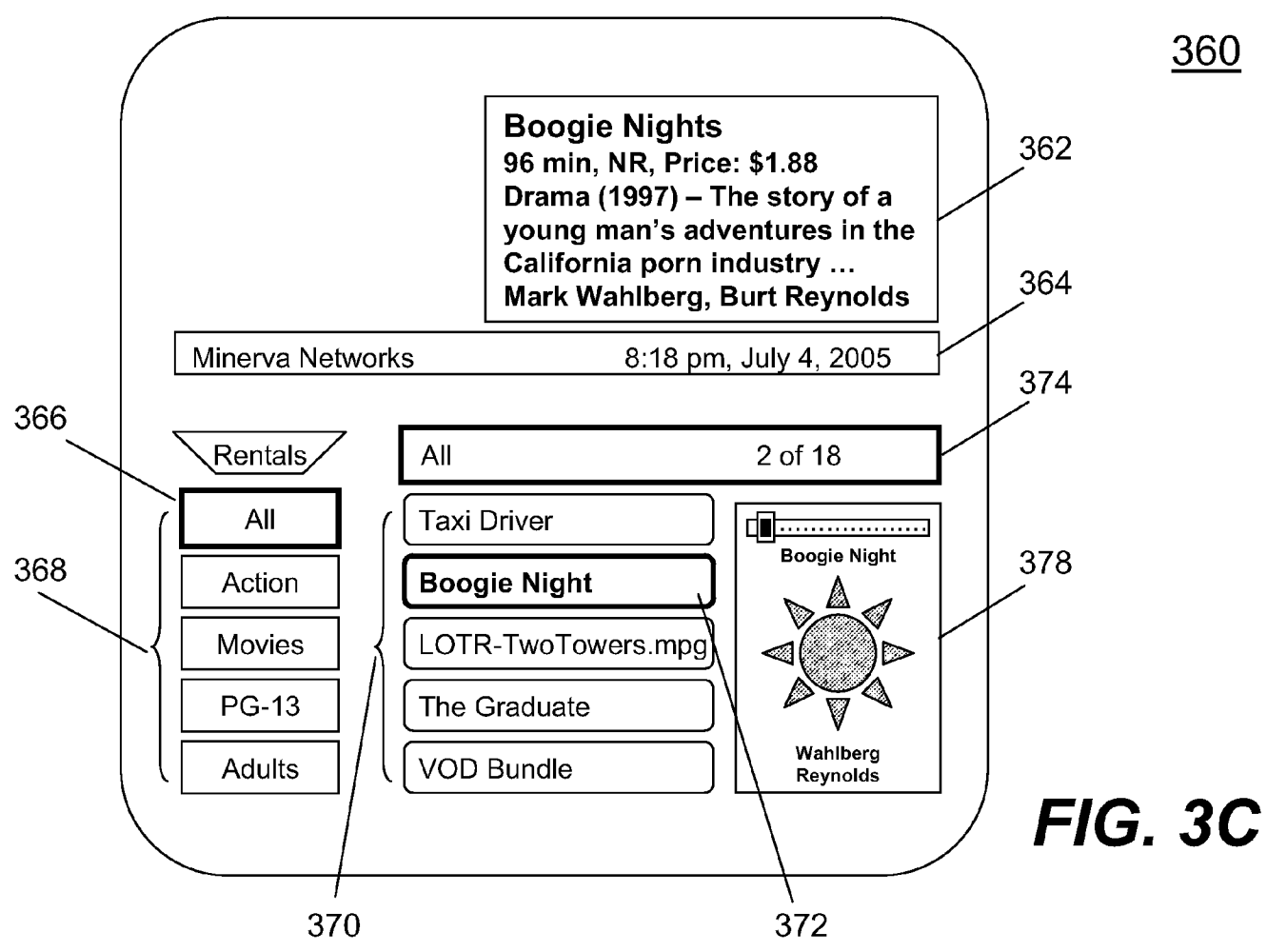
Figure 3D:
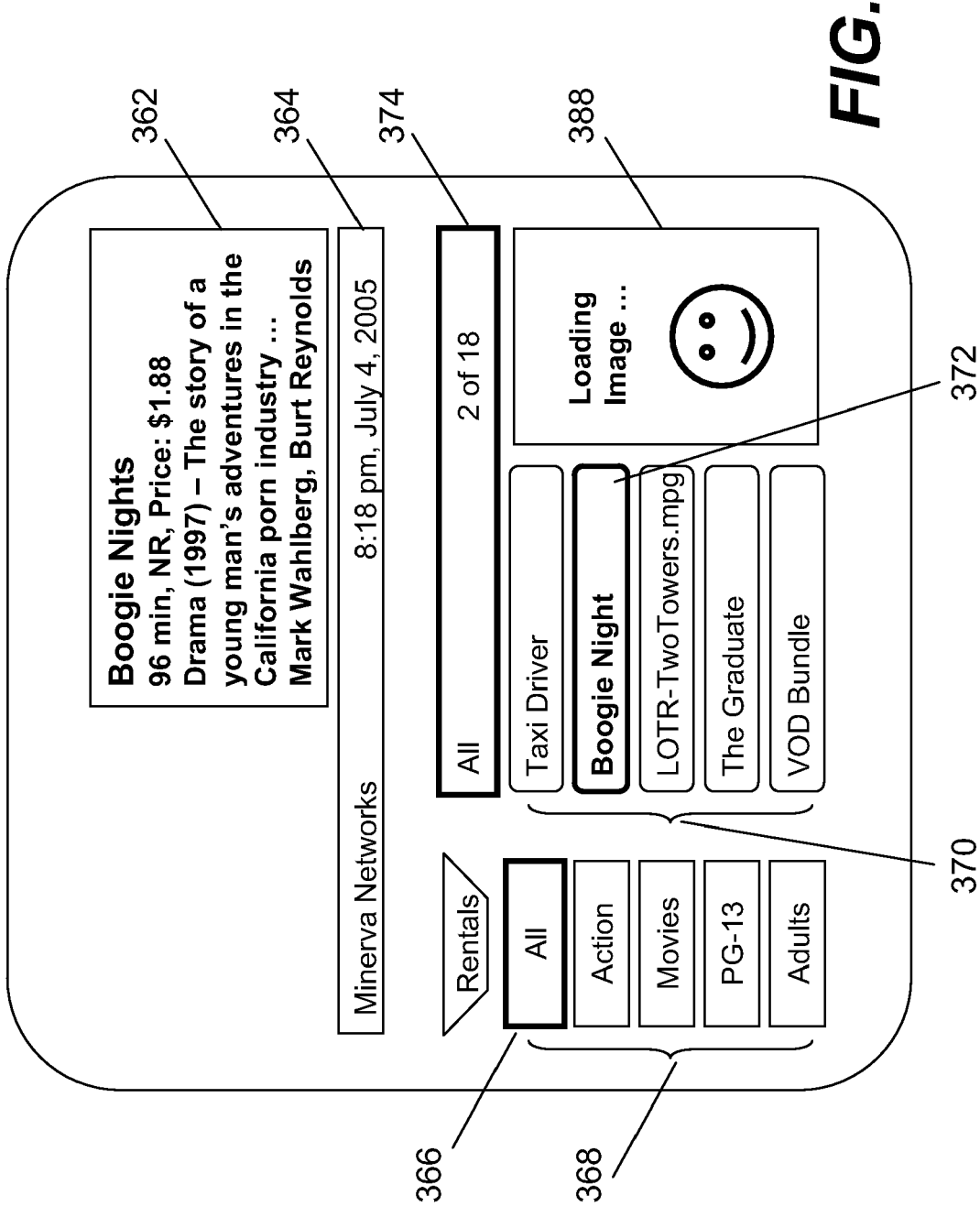

FIG. 3B shows a data structure used in a memory of a computer in accordance with one embodiment of the present invention. In this embodiment, an application module 306 resides in the exemplary memory 308 of FIG. 3A. The module 306 creates an electronic media programs catalog list 309 comprising a plurality of asset records 1-9 341, 342, . . . 349. The catalog list 309 is displayed as a menu in a display monitor or screen of the terminal device (e.g., set-top box 102 of FIG. 1B). All of the available media asset records are included in the list. The user or subscriber can browse the catalog list 309 via a control device, which may include, but not be limited to, a keyboard, a mouse, a remote control, a touch-screen interface, and alike. Each of the asset records in the catalog list 309 is associated with a graphical image depicting the media program. The images 351, 352, . . . 354 are stored in an image cache 310. Each of the asset records may include the title and corresponding description of the media program. This is basically text based data, while graphical image is a 2-dimensional graphical data. In one embodiment, the asset records are stored in the memory or the secondary memory of the client device (e.g., the set-top box 102 of FIG. 1A or 1B). Only a portion of the image data is stored on the memory of the client device due to the capacity constraint of the memory. An image windowing technique of the present invention allows the application module 306 to pre-fetch images from the server in a predictive method based upon the user browsing direction. Lower priority images will be discarded to make room to store the higher priority ones in the image cache.

The catalog list 309 can only be scrolled in a sequential manner (i.e., the record in the catalog list can only be browsed one after another in the order presented to the user). The user can not randomly select a record. For example, there are 9 records shown in FIG. 3B. The order of the records in the catalog list 309 is as follows: record 1 341, record 2 342, record 3 343, record 4 344, . . . , record 9 349. For example, after the user finishes browsing record 2 342, the next choice is either record 3 343 or record 1 341. If the user wishes to see record 9 349, he/she must scroll down the list seven times from record 2 342. The image windowing cache 310 is a memory used to store the graphical images to be displayed with the text data of the asset record that a user is browsing. In this embodiment, image 1 351 corresponds to record 1, image 2 352 record 7, image 3 353 record 4, and image 4 354 record 9. Other images are stored in the server and will be fetched or pre-fetched when the present invention detects or predicts the user demand, respectively. Although there are only 9 asset records and 4 images are shown in FIG. 3B, the present invention allows other numbers of records and images based upon the capacity of the local image windowing cache.

FIG. 3C shows a screen shot 360 of the catalog list in accordance with one embodiment of the present invention. The screen shot 360 includes a list of criteria 368 in the left column. In this embodiment, the criterion chosen is "ALL"

366, which is shown as an expanded box 374 of the right column in the lower portion of the screen. There are 26 records in this embodiment. The first five records 370 that fit the "ALL" criterion are listed right below the expanded box 374 in the right column. The user scrolls the pointer at the second record, a movie "Boogie Night" 372. This is reflected in the expanded box 374 as 2 of 26. The brief descriptions of the asset record "Boogie Night" 372 are shown in a description box 362 on the top half of the screen shot. A graphical image 378 for the record "Boogie Night" 372 is shown in the lower right corner of the display. Also the date and time information are shown in the middle box 364. To browse another record, the user may scroll up or down the list 370, which is only allowed to access sequentially. If the image 378 is not currently stored in the local image windowing cache, an image with a message "loading image . . ." (i.e., 388 of FIG. 3D) is shown instead.

Figure 4A:
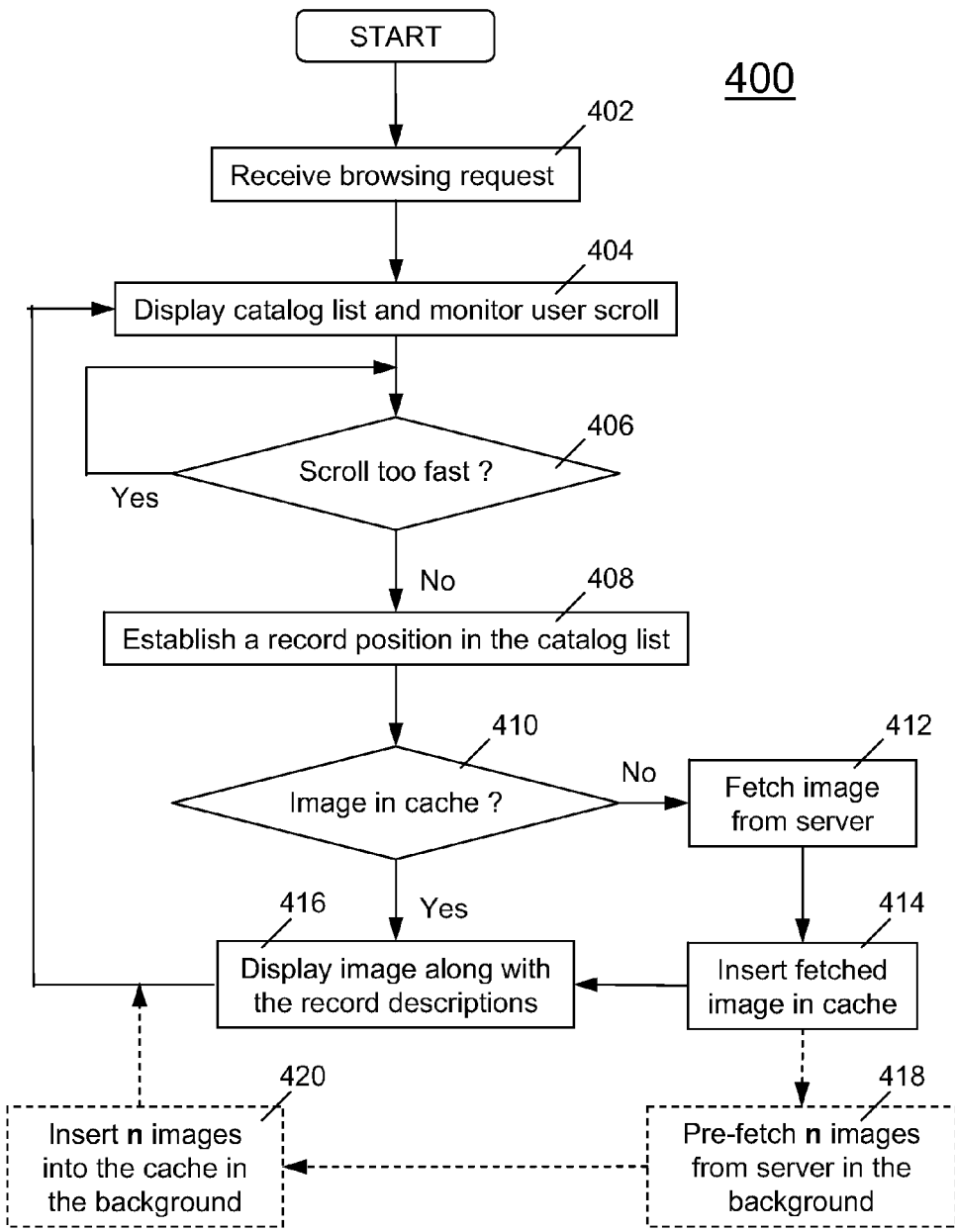
FIG. 4A is a process or flow diagram of image windowing according to one embodiment of the present invention.

FIG. 4A is a flow diagram of image windowing process 400 according to one embodiment of the invention. The image windowing processing 400 is, for example, performed mainly by a terminal device 210 illustrated in FIG. 2 or the set-top box 102 illustrated in FIGS. 1A-1B. The process 400, which is preferably understood in conjunction with previous figures especially with FIGS. 3A-3D, may be implemented in software, It is noted that the image data is fetched from a server (e.g., 206 of FIG. 2 and 106 of FIGS. 1A and 1B) to an image windowing cache of the terminal device.

At 402, the image windowing process 400 begins with receiving a request in a terminal device from a user, who wishes to browse, to examine, to rent, or to purchase media programs (e.g., rental media, video-on-demand, etc.) on the server. Responding to the user request, the process 400 creates and shows an electronic media programs catalog list for the user on a display of the terminal device (e.g., a monitor of a computer, a television connecting to the set-top box) at 404. The catalog list contains all of the media asset records on the terminal device. The asset records can be sorted by certain criteria (e.g., genre, rating, type, etc.). In one embodiment, a screen shot 360 of the catalog list is shown in FIG. 3C. Once the user has chosen one of the criteria (e.g., "ALL" 366 of FIG. 3C), a list of media programs 370 is available for the user to browse. The user browses the catalog list using a pointer/curser via a control device (e.g., a remote control, a keyboard, a mouse, a touch screen interface, etc.). The catalog list can only be scrolled in a sequential order either forward or backward one at the time. Each of the media programs in the list represents an asset record, which contains a title, a brief description and other information (e.g., length, cost, rating, etc.) related to the program. In addition, an associated graphical image 378 is displayed along with the text based asset record. In order to keep tracking of which media program or asset record that the user is currently reading or browsing, the position of the pointer must also be monitored by the process 400 at 404.

Next the process 400 moves to a test 406, which determines whether the scrolling via the user control device is too fast. If the user scrolls passed a number of asset records consecutively within a predefined time interval (e.g., one second between two key presses), then the result of the test 406 is positive. When the test 406 is true, the process 400 follows the yes branch and ignores intermediate asset records that the user has scrolled passed. The process 400 will continue until the test 406 is false (i.e., the scrolling is not faster than the pre-determined interval). In other words, the user has settled in one of the asset records in the catalog list. Then the process 400 moves to 408, in which an asset record position in the catalog list is established. The text data in the established asset record is shown as an expanded list (e.g., 370 of FIG. 3C). And the process 400 moves on to another test 410, which determines whether the graphical image corresponding to the established asset record is already stored in the image windowing cache (i.e., 310 of FIG. 3B) in the terminal device. If the image is found in the local image windowing cache, the process 400 displays the image along with the text data of the asset record at 416. If the image is not found in the local image windowing cache, the process 400 fetches the image from the server, and shows a message (e.g., 388 of FIG. 3D) to indicate the image is being loaded in the display in the meantime at 412. When the image is fetched from the server, the process 400 inserts the fetched image into the local image windowing cache at 414 before displaying the graphical image at 416. While inserting the fetched image, the process 400 pre-fetches additional n images from the server in the background at 418. The pre-fetched images are inserted into the local image windowing cache at 420. The pre-fetching and inserting are described below in details in FIGS. 4B and 4C, respectively. The pre-fetching scheme is to anticipate the user's next move. If the predication is correct, then the user does not have to wait for the image loading when the process 400 moves back to 404 for the next selection in the catalog list.

Figure 4B:
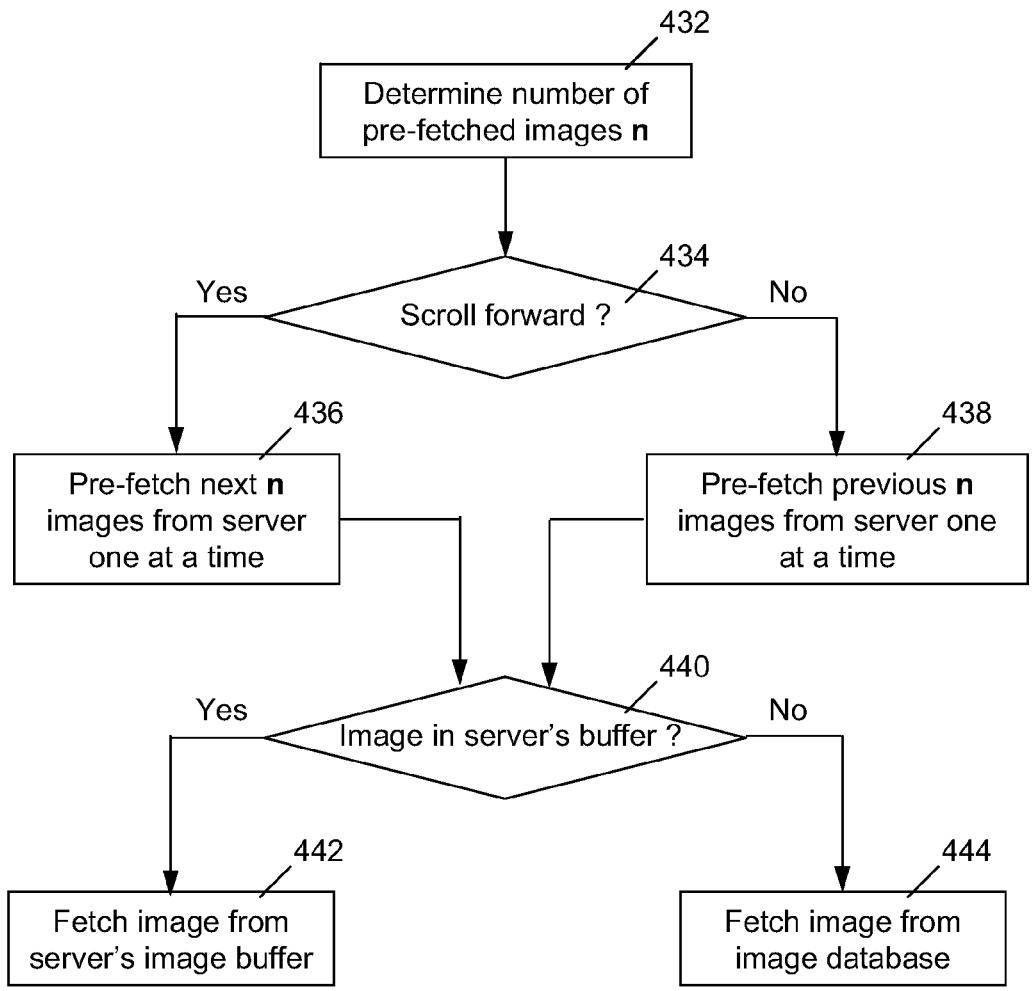
FIG. 4B is a process or flow diagram of pre-fetching images from a media server in accordance with one embodiment of the present invention.

FIG. 4B shows a process or flow diagram for pre-fetching additional n images as described in 418 of FIG. 4A. The process 418 starts at 432 with a determination of how many additional images to pre-fetch. The number n is a positive integer based on the capacity of the image windowing cache of the terminal device and/or the speed of the delivery network. In one embodiment, the number n is set to 5 images, because it is assumed that each image requires 3 seconds to fetch and it takes the user 15 seconds to read the current description. The process 418 moves to a test 434, which determines whether the user scrolls forward or backward. Because the catalog list can only be scrolled in a sequential order, the direction of the scroll can be determined with the two established positions. If the test 434 detects the user scrolls forward, the process 418 follows the yes branch to 436. The next n images will be pre-fetched from the server one at the time. On the other hand, if the test 436 detects the opposite scroll direction, the process 418 follows the no branch to 438 to pre-fetch the previous n images from the server. After determined which n images to pre-fetch, the process 418 moves to a test 440. Each of the n images to be pre-fetched is checked first in a cache on the server (e.g., 106 of FIGS. 1A-1B). If the image is already in the server's cache, the process 418 fetches the image from the cache at 442. If not, the process 418 needs to fetch the image from the database (e.g., 110 of FIGS. 1A-1B). This completes the process of pre-fetching 418.

Figure 4C:
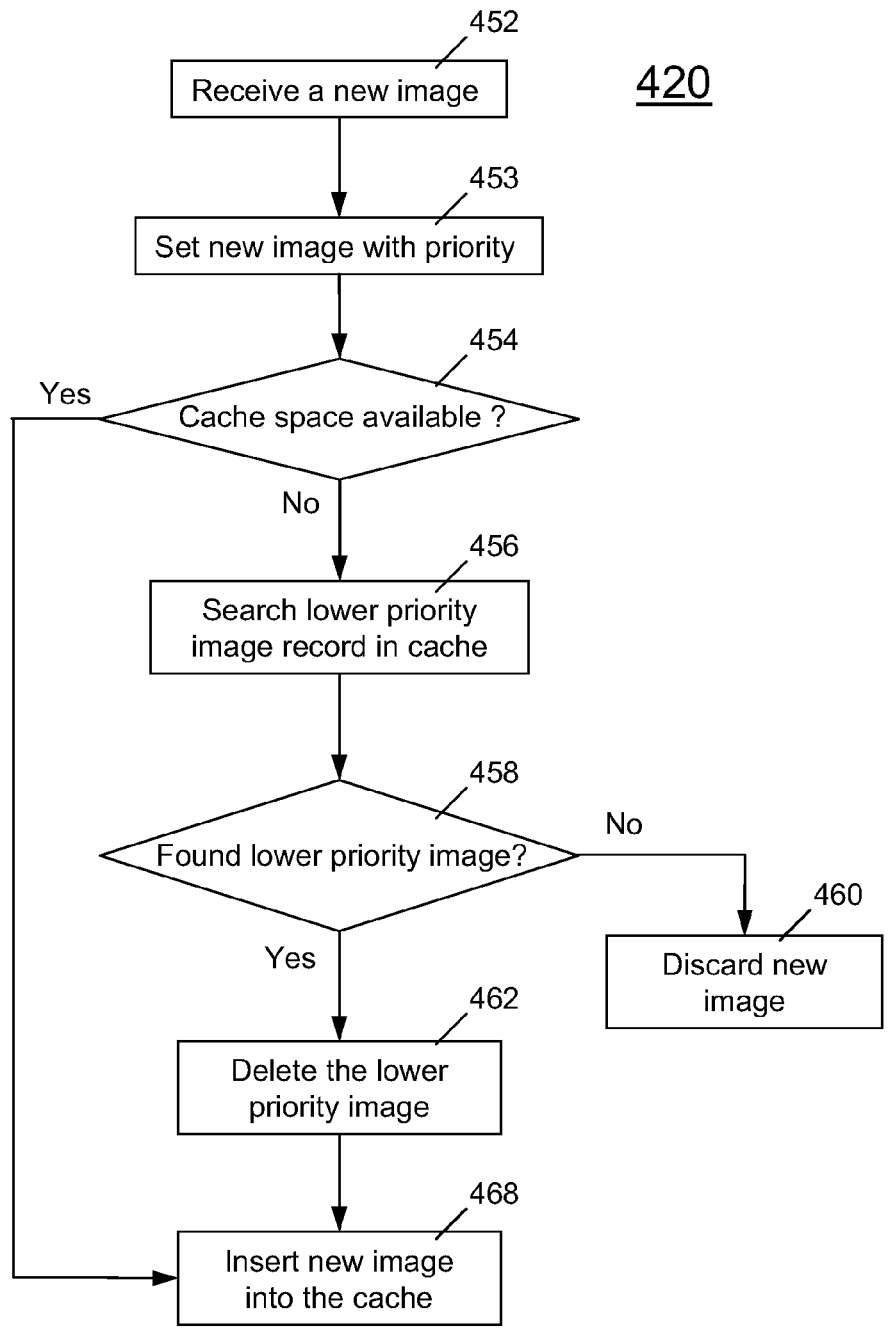
FIG. 4C is a process or flow diagram of inserting image into a windowing cache on a client system.

FIG. 4C shows a process 420 of inserting the fetched image into the image windowing cache in accordance with one embodiment of the present invention. The process 420 receives a fetched image to be inserted into the image windowing cache (e.g., 310 of FIG. 3B) from the server at 452. Each new image is assigned a priority at 453. Image corresponding to the current record or media program being viewed is always assigned the highest priority. The process 420 moves to a test 454 to determine if there is available space in the image windowing cache. If the test 454 is true, the process 420 inserts the new fetched image into the image windowing cache at 468 and the process 420 ends. If the test 454 is false, then the process 420 follows the no branch to 456. The process 420 searches the existing images in the image windowing cache to find a lower priority image. The priority can be determined in a number of ways. In one embodiment, the priority is determined as first-in first-out (FIFO). In another embodiment, the priority depends on the user's preference. At the next test 458, if the process 420 does not find any existed image with equal or lower priority than the new image, the new image will be discarded and will not be inserted into the image cache at 460. If the process 420 finds a lower priority image, the lower priority image will be deleted from the image windowing cache at 462 before the process 420 inserts the new image at 468.

The invention is preferably implemented in software. The invention can also be embodied as computer readable code on a computer readable medium. The computer readable medium is any data storage device that can store data which can be thereafter be read by a computer system. Examples of the computer readable medium include read-only memory, random-access memory, floppy disks, CD-ROMs, DVDs, magnetic tape, optical data storage devices, carrier waves. The computer readable media can also be distributed over network coupled computer systems so that the computer readable code is stored and executed in a distributed fashion.

The advantages of the invention are numerous. Different embodiments or implementations may yield one or more of the following advantages. Different embodiments or implementations may yield one or more of the following advantages. One advantage of the invention is that the images associated with media asset records can be stored remotely on a server, while the set of windowing images would be pre-fetched to a client system automatically. Another advantage is that image windowing allows any client system to work properly whether the client system is a bare-bone set-top box or a personal video recorder without scarifying the user/subscriber's experience while browsing the electronic media programs catalog list.

Many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for pre-fetching data for displaying graphical images associated with media asset records, said method comprising:
    receiving a browsing request at a terminal device;
    displaying a catalog list for all of the media asset records stored on the terminal device, each of the media asset records is associated with one of a plurality of graphical images stored on a server located remotely from the terminal device;
    monitoring a first record position in the catalog list controlled by a first user scroll and detecting a speed of the first user scroll;
    when the speed is slower than a predefined time interval, establishing the first record position as a currently viewed media asset record;
    when a particular image associated with the currently viewed media asset record is unavailable in a local image windowing cache,
        displaying text data of the currently viewed media asset record along with a message indicating the particular image is being fetched from the server, and
        inserting the particular image into the image windowing cache;
    otherwise, displaying text data of the currently viewed media asset record along with the particular image;
    pre-fetching additional n images from the server in accordance with a user scroll direction;
    inserting the additional n images into the image windowing cache; and
    continue monitoring a second record position in the catalog list controlled by a second user scroll.

2. The method as recited in claim 1, wherein the browsing request is generated from a user on the terminal device.

3. The method as recited in claim 2, wherein the server is a video-on-demand server and the terminal device is a set-top box, and wherein the server and the terminal device are coupled to a data network.

4. The method as recited in claim 1, wherein the media asset records are configured in the catalog list such that the media asset records can only be browsed and accessed sequentially but not randomly.

5. The method as recited in claim 1, wherein the user scroll is generated from a remote control, a mouse, a keyboard, or a touch screen interface.

6. The method as recited in claim 1, wherein the predefined time interval is one second.

7. The method as recited in claim 1, wherein the text data of the currently viewed media asset record includes a title, a length of the program, a brief description and casts information and text data is stored in the terminal device.

8. The method as recited in claim 1, wherein the image windowing cache is located in a memory of the terminal device.

9. The method as recited in claim 1, said pre-fetching the additional n images in accordance with a user scroll direction further comprising:
    determining value of n;
    determining the user scroll direction;
    when the direction is forward, pre-fetching next n images from the server; and
    when the direction is backward, pre-fetching previous n images from the server.

10. The method as recited in claim 9, wherein the direction is determined by an immediate prior record position and current record position in the catalog list.

11. The method as recited in claim 9, wherein the value of n is based on available capacity in the image windowing cache and a delivery speed between the server and the terminal device.

12. The method as recited in claim 1, said pre-fetching the additional n images and said inserting the additional n images are performed in background.

13. The method as recited in claim 1, said inserting the additional n images further comprising:
    assigning priority to each of the additional n images;
    searching an available storage space in the image windowing cache;
    when the space is unavailable, searching for existed images in the image windowing cache with priority equal or lower than said each of the additional n images, deleting lower priority images from the cache, and inserting said each of the additional n images into the image windowing cache;
    otherwise, inserting said each of the additional n images into the image window cache.

14. The method as recited in claim 13, wherein the priority is set as a first-in-first-out basis.

15. A computer program product including a computer usable medium having computer readable code embodied in the medium for causing an application module to execute on a computer for displaying graphical images associated with media asset records, the computer program product comprising:
    computer readable code for receiving a browsing request at a terminal device;
    computer readable code for displaying a catalog list for all of the media asset records stored on the terminal device, each of the media asset records is associated with one of a plurality of graphical images stored on a server located remotely from the terminal device;

computer readable code for monitoring a first record position in the catalog list controlled by a first user scroll and computer readable code for detecting a speed of the first user scroll;

when the speed is slower than a predefined time interval, computer readable code for establishing the first record position as a currently viewed media asset record being viewed;

when a particular image associated with the currently viewed media asset record is unavailable in a local image windowing cache,
   computer readable code for displaying text data of the currently viewed media asset record along with a message indicating the particular image is being fetched from the server, and
   computer readable code for inserting the particular image into the image windowing cache;

otherwise, computer readable code for displaying text data of the currently viewed media asset record along with the particular image;

computer readable code for pre-fetching additional n images from the server in accordance with a user scroll direction;

computer readable code for inserting the additional n images into the image windowing cache; and computer readable code for continue monitoring a second record position in the catalog list controlled by a second user scroll; wherein a processor coupled to a memory stores the computer program product.

16. The computer program product as recited in claim 15, said computer program code for pre-fetching the additional n images further comprising:
   computer readable code for determining value of n;
   computer readable code for determining the user scroll direction;
   when the direction is forward, computer readable code for pre-fetching next n images from the server; and
   when the direction is backward, computer readable code for pre-fetching previous n images from the server.

17. The computer program product as recited in claim 15, wherein the server is a video-on-demand server and the terminal device is a set-top box, and wherein the server and the terminal device are coupled to a data network.

18. A system for pre-fetching data for displaying graphical images associated with media asset records, said system comprising:
   a data network;
   a server coupled to the data network, said server configured to store images data associating with the media asset records;
   a terminal device coupled to the data network, said terminal device comprising:
      a communication interface to communicate with the server via the data network;
      a memory for storing computer readable code for an application module;
      an I/O interface coupled to a control device for receiving input from a user and coupled to an output device for displaying the application module output; and
      a processor coupled to the memory, the I/O interface, and the communication interface, the processor executing the computer readable code in the memory to cause the application module to perform operations of:
         receiving a browsing request from the user;
         displaying a catalog list for all of the media asset records stored in the memory on the terminal device, of the media asset records is associated with one of a plurality of graphical images stored on a server located remotely from the terminal device;
         monitoring a first record position in the catalog list controlled by a first user scroll and detecting a speed of the first user scroll;
         when the speed is slower than a predefined time interval, establishing the first record position as a currently viewed media asset record being viewed;
         when particular image associated with the currently viewed media asset record is unavailable in a local image windowing cache in the memory,
            displaying text data of the currently viewed media asset record along with a message indicating the particular image is being fetched from the server, and
            inserting the particular image into the image windowing cache;
         otherwise, displaying text data of the currently viewed media asset record along with the particular image associated with the media program;
         pre-fetching additional n images from the server in accordance with a user scroll direction;
         inserting the additional n images into the image windowing cache; and
         continue monitoring a second record position in the catalog list controlled by a second user scroll.

19. The system as recited in claim 18, wherein the server is a video-on-demand server and the terminal device is a set-top box.

20. The system as recited in claim 19, wherein the images is stored in a database that is accessible from the server.

21. The system as recited in claim 19, wherein the terminal device further comprising: a hard disk coupled to the processor for storing the image.

22. The system as recited in claim 18, said pre-fetching the additional n images further comprising:
   determining value of n;
   determining the user scroll direction;
   when the direction is forward, pre-fetching next n images from the server; and
   when the direction is backward, pre-fetching previous n images data from the server.

23. The system as recited in claim 18, said inserting the additional n images further comprising:
   assigning priority to each of the additional n images;
   searching an available storage space in the image windowing cache;
   when the space is unavailable, searching for existed images in the image windowing cache with priority equal or lower than said each of the additional n images, deleting lower priority images from the cache, and inserting said each of the additional n images into the image windowing cache;
   otherwise, inserting said each of the additional n images into the image windowing cache.

24. The system as recited in claim 23, wherein the particular image associated with the currently viewed media asset record is assigned to a highest priority.

* * * * *